United States Patent [19]

Baker et al.

[11] Patent Number: 4,662,943

[45] Date of Patent: * May 5, 1987

[54] CEMENT COMPOSITIONS CONTAINING A POLYSACCHARIDE AND A SALT AND METHOD OF CEMENTING CASING IN A WELL

[75] Inventors: Wilford S. Baker, Thibodaux, La.; James J. Harrison, Glenshaw, Pa.

[73] Assignee: Chevron Research Company, San Francisco, Calif.

[*] Notice: The portion of the term of this patent subsequent to Jul. 31, 2001 has been disclaimed.

[21] Appl. No.: 684,659

[22] Filed: Jun. 12, 1984

Related U.S. Application Data

[63] Continuation-in-part of Ser. No. 466,550, Feb. 15, 1983, Pat. No. 4,462,836, and a continuation-in-part of Ser. No. 466,551, Feb. 15, 1983, Pat. No. 4,462,837, and a continuation-in-part of Ser. No. 518,091, Jul. 28, 1983, abandoned.

[51] Int. Cl.$^4$ ............................................. C04B 7/353
[52] U.S. Cl. ...................................... 106/93; 166/293
[58] Field of Search ..................... 106/92, 93; 166/293

[56] References Cited

U.S. PATENT DOCUMENTS

| | | | |
|---|---|---|---|
| 2,580,565 | 1/1952 | Ludwig | 106/93 |
| 3,465,824 | 9/1969 | Kucera | 106/93 |
| 3,465,825 | 9/1969 | Hook et al. | 106/93 |
| 3,483,007 | 12/1969 | Hook | 106/93 |
| 3,959,003 | 5/1976 | Ostroot et al. | 106/93 |
| 4,462,836 | 7/1984 | Baker et al. | 106/92 |
| 4,462,837 | 7/1984 | Baker et al. | 106/93 |

Primary Examiner—William R. Dixon, Jr.
Assistant Examiner—Steven Capella
Attorney, Agent, or Firm—S. R. LaPaglia; R. C. Gaffney

[57] ABSTRACT

A novel cement composition comprising (1) cement, (2) at least one salt, and (3) at least one polysaccharide or mixture of polysaccharides having a solution time greater than about 10 minutes; aqueous slurries prepared from these novel cement compositions and a method of cementing casing in the borehole of a well using such novel aqueous cement slurries.

55 Claims, No Drawings

CEMENT COMPOSITIONS CONTAINING A POLYSACCHARIDE AND A SALT AND METHOD OF CEMENTING CASING IN A WELL

This application is a continuation-in-part of our applications Ser. No. 466,550 for Cement Composition and Method of Cementing Casing in a Well, filed Feb. 15, 1983 now U.S. Pat. No. 4,462,836; Ser. No. 466,551 for Cement Composition and Method of Cementing Casing in a Well, filed Feb. 15, 1983 now U.S. Pat. No. 4,462,837; and Ser. No. 518,091 for Aqueous Cement Slurries and Method of Cementing Casing in a Well, filed July 28, 1983 abandoned.

BACKGROUND OF THE INVENTION

1. Field of the Invention:

This invention is directed to a novel cement composition for the preparation of a novel aqueous cement slurry particularly useful in cementing casing in the borehole of a well. The novel cement composition comprises (1) an API Class "A" through "H" cement, (2) at least one polysaccharide having specially defined solubility characteristics, and (3) at least one salt.

2. Description of the Art:

After a borehole of an oil or gas well has been drilled, casing is run into the well and is cemented in place by filling the annulus between the borehole wall and the outside of the casing with a cement slurry, which is then permitted to set. The resulting cement provides a sheath surrounding the casing that prevents, or inhibits, communication between the various formations penetrated by the well. In addition to isolating oil, gas and water-producing zones, cement also aids in (1) bonding and supporting the casing, (2) protecting the casing from corrosion, (3) preventing blowouts by quickly forming a seal, (4) protecting the casing from shock loads in drilling deeper, and (5) sealing off zones of lost circulation. The usual method of cementing a well is to pump a cement slurry downwardly through the casing, outwardly through the lower end of the casing with a shoe and/or float valve and then upwardly into the annulus surrounding the casing. The upward displacement of the cement slurry through the annulus can continue until some of the cement slurry returns to the well surface, but in any event will continue past the formations to be isolated.

If the primary cementing of the casing, as described above, does not effectively isolate the formations, it may become necessary to perforate the casing at intervals along its length and then squeeze a cement slurry under high pressure through the perforations and into the defined annulus to plug any channels that may have formed in the cement sheath. Squeezing is an expensive operation that requires bringing perforating and cementing service companies back to the well and is therefore to be avoided, if possible.

It is critical in preparing cement compositions useful in cementing casing in the borehole of a well that they be characterized by a viscosity designed for optimum mixing at varying ambient temperatures, even at, or near, freezing temperatures, flow properties sufficient to facilitate and maintain lower laminar and/or plug flow and adequate gel strength to provide thixotropic properties to the slurry when pumping ceases.

Cement slurries, using conventional polysaccharide additives, thin or become less viscous with increasing temperatures, result in turbulent flow at high displacement rates, lose their suspension properties or capabilities as they become thinner or less viscous; and have a tendency to commingle with drilling fluids. If mixed with high-density additives, separation may occur at high temperatures, and such slurries are difficult to mix at low temperatures.

Slurries of decreased viscosities may channel through drilling fluids. Turbulent flow may also erode the wall of the borehole. If suspension properties are lost, water channels can be created in the slurries that allow gas, oil or water to migrate up or down (depending on the differential pressure and direction of pressure). Commingling of cement and drilling fluid results in contamination of the cement and will result in a poor cement bond and lower compressive strengths. When a slurry is mixed under freezing conditions, the slurry density can be lower than desired and will result in lower compressive strengths and insufficient hydrostatic pressures to contain formation pressures.

SUMMARY OF THE INVENTION

We have found that the above difficulties can be obviated using the novel cement compositions defined and claimed herein, since the novel aqueous cement slurries prepared from our novel cement compositions (1) will have flow properties that will prevent or substantially inhibit turbulent flow in the annulus during displacement of the slurry, (2) will provide superior suspensions, (3) does not affect particle separation at high temperatures when slurry density is increased, and (4) can easily be mixed at low temperatures. All of these desired features are achieved because the initial viscosity at ambient conditions of the aqueous cement slurries of this invention increase with time and temperature, which means the slurries are easy to mix at ambient temperatures on the surface but increase in viscosity which is desirable under downhole conditions where the temperature gradient increases.

The novel cement composition that will provide the above desired characteristics comprises (1) an API Class "A" through "H" cement, (2) at least one polysaccharide having a solubility characteristic such that the time for an aqueous solution of the polysaccharide to reach 90 percent of its final viscosity value at a pH from 9.2 to 9.6; a temperature of about 23° C. and a shear rate of 300 rpm is greater than about 10 minutes, and (3) at least one salt. Preferably the compositions will contain, in addition, a dispersant.

The cement, or first, component of the novel cement composition suitable for preparing the novel aqueous slurry can be any of the cements defined as Classes "A" through "H" in API, Spec. 10, First Edition, page 6, or in ASTM Bulletin C150.

The second necessary component of the novel cement compositions claimed herein is a polysaccharide or a mixture of polysaccharides which have a solubility characteristic such that the time for an aqueous solution of the polysaccharide or mixture of polysaccharides to reach 90 percent of their final viscosity value at a pH of 9.2 to 9.6 at a temperature of about 23° C. and a shear rate of 300 rpm is greater than about 10 minutes, preferably from 12 to about 120 minutes, and more preferably from about 14 to about 40 minutes.

A polysaccharide is a polymer made up of repeating units of monosaccharides. The latter are the simplest members of the carbohydrate family and can be defined by the formula $C_nH_{2n}O_n$, wherein n is equal to or greater than 4, with n preferably being below 10. These polysaccharides can have molecular weights in the range of about 10,000 to about 10,000,000, but generally will be in the range of about 100,000 to about 3,000,000. By "polysaccharide," we mean to include unsubstituted as well as substituted derivatives thereof, examples of which include hydroxyalkyl substituents, such as hydroxyethyl, hydroxypropyl and hydroxybutyl, carboxymethyl, cyanoethyl, etc. Examples of polysaccharides that can be employed herein include cellulose, guar gum, starch, alginates, cargeenan, gum agar, gum arabic, gum ghatti, gum karaya, gum tragacanth, locust bean gum, pectins, tamarind gum and xanthan gum. In addition, derivatives, such as hydroxyethylcellulose ether, hydroxypropylcellulose ether, carboxymethylhydroxyethylcellulose ether, carboxymethylcellulose ether, hydroxypropylguar, hydroxypropylstarch, hydroxyethylstarch, cyanoethylguar, cyanoethylcellulose, etc., can be used. Of these, we prefer to use hydroxyethylcellulose ether, hydroxypropylcellulose ether, xanthan gum and carboxymethylhydroxyethylcellulose ether.

The polysaccharide can be man-made, such as those prepared and sold by such companies as Hercules Inc. under the trade name Natrosol or Union Carbide Corporation under the trade name Cellosize. The preferred hydroxyethylcellulose ether (HEC) is available in varying viscosities and preferably the HEC has a viscosity above about 200 centipoises when measured in a 5 weight percent aqueous solution but less than about 6000 centipoises when measured in a 1 weight percent aqueous solution. In a preferred range the viscosity will be from about 1000 to about 10,000 centipoises when measured in a 2 weight percent aqueous solution. The critical viscosity of the hydroxypropylcellulose ether must be above about 100 centipoises when measured in a 2 weight percent aqueous solution, but less than about 10,000 centipoises when measured in a 1 weight percent aqueous solution. In a preferred range, the viscosity will be from about 1000 to about 3000 centipoises when measured in a 1 weight percent aqueous solution.

The degree of substitution and the molar substitution of the hydroxyalkylcellulose ethers used herein are also important. By "degree of substitution" we mean the average number of total substituents present per glucose unit, while by "molar substitution" we mean the number of mols of ethylene oxide or propylene oxide that are attached to each glucose unit. The degree of substitution can be in the range of about 0.5 to about 3.0, preferably from about 0.9 to about 2.8. The molar substitution can be in the range of about 0.5 to about 10.0, preferably from about 1.0 to about 6.0. It is understood that the hydroxyethylcellulose ether can also carry some propylene oxide substituents and, similarly, hydroxypropylcellulose ether can also carry some ethylene oxide units.

The polysaccharide can also be prepared by microbial action. That is, the polysaccharide or mixture of polysaccharides, preferably extracellular polysaccharides, produced as a result of microbial action, which polysaccharides are generally hydrophilic colloidal materials.

The important feature of this invention is that the polysaccharide or mixture of polysaccharides employed must possess a critical solubility characteristic in order to prepare the cement compositions or aqueous slurries of this invention which are especially useful in cementing casing in the borehole of a well. The desired solubility characteristic is such that the solution time of the polysaccharide or mixture of polysaccharides is greater than about 10 minutes.

The test procedure to determine the solution time of a given polysaccharide or mixture of polysaccharides under the above conditions is quite simple and well known to those having ordinary skill in the art. It is known, for example, that the solution time of a polysaccharide is greatly influenced by temperature, pH, and the rate of shear (see, for example, Hercules Technical Information Bulletin VC-507, also labeled HER 27477). The solution time is defined for this application as the time in minutes required for an aqueous solution of a given polysaccharide or mixture of polysaccharides to develop 90 percent of its final viscosity at a temperature of 23° C.±2° C., a pH of 9.4±0.2 and a shear rate of 300 rpm. The solution times which are required for the polysaccharide or mixture of polysaccharides to prepare the novel compositions of this invention are greater than about 10 minutes, preferably from 12 to about 120 minutes, and most preferably from about 14 to 40 minutes. It has also been found that the solution times for the various polysaccharides are roughly additive so that mixtures of polysaccharides can be employed so long as the mixture has a solution time of greater than about 10 minutes.

As noted above, the polysaccharides useful in the preparation of the novel compositions of this invention can be obtained from companies such as Hercules and Union Carbide Corporation. It has been found that the preferred hydroxyethylcellulose ethers, which initially may fail to have the proper solution times, can be heat treated under conditions set forth below in a shallow-dish heating vessel to ensure even heating throughout to produce an HEC having the desired solution times. Yet another technique which has been found valuable in producing an HEC having the desired solution times is to crosslink the HEC during its preparation or after with a 1,2-dicarbonyl such as glyoxal. In many instances the HEC which is available from Hercules or others contains glyoxal which is intended to aid in preventing the HEC from clumping when the HEC is admixed with water. In accordance with this invention an HEC or other polysaccharide or mixture of polysaccharides can be treated with a sufficient amount of a 1,2-dicarbonyl to result in a final polysaccharide or mixture of polysaccharides which have a solution time of greater than about 10 minutes. Alcoholic hydroxyl groups such as are present on HEC are known to react with aldehydes to produce hemi-acetals under acid or base conditions. The hemi-acetals can be further reacted with alcohol to form an acetal plus water. The formation of acetals and hemi-acetals are reversable reactions. However, while the hemi-acetal linkage is hydrolized under both acid and base conditions, the hydrolysis of an acetal linkage is slow under basic conditions. The cement slurry environment is, of course, highly basic. It is theorized that the polysaccharides which have solution times greater than about 10 minutes are polysaccharides which are crosslinked with acetal rather than hemi-acetal linkages formed perhaps by the reaction of the hydroxal groups on the polysaccharide with the aldehyde group on the 1,2-dicarbonyl, i.e., glyoxal. Other means of crosslinking the polysaccharides where the linkages are slowly hydrolized in basic media so that the solution times of the polysaccharide are within the limit set forth above, are also acceptable. For example, a sample of HEC was obtained from Hercules Inc. and was found by analysis to contain 0.65 percent by weight glyoxal. This material was found to have a solution time of 6 minutes. As will be shown in Example 27 below, the solution time of this same HEC was found to increase significantly when the material was treated with glyoxal.

The 1,2-dicarbonyl suitable for use can be defined by the following formula:

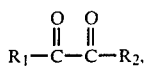

$$R_1-\overset{\overset{O}{\|}}{C}-\overset{\overset{O}{\|}}{C}-R_2,$$

wherein $R_1$ and $R_2$, the same or different, are members selected from the group consisting of hydrogen, alkyl radicals having from one to eight, preferably from one to four, carbon atoms; aryl radicals having from six to 20, preferably from six to 10, carbon atoms; alkenyl radicals having from two to 12, preferably from two to four, carbon atoms; cycloalkyl radicals having from three to 10, preferably from three to six, carbon atoms; and aralkyl and alkaryl radicals having from six to 20, preferably from six to 12, carbon atoms. Specific examples include glyoxal ($R_1=R_2=H$), biacetyl ($R_1=R_2=CH_3$) and benzil ($R_1=R_2=$phenyl).

The third necessary component is at least one salt. By "salt" we intend to include organic as well as inorganic salts. Particularly effective are inorganic monovalent and polyvalent metal salts, such as magnesium chloride, ammonium chloride, potassium chloride, sodium chloride, calcium chloride, aluminum chloride, stannous chloride, and sodium borate. Of these we prefer potassium chloride. The amount of salt to employ is suitably from 0.001 to 4.5 weight percent based on the weight of cement and is preferably from 0.1 to 3 weight percent based on the weight of cement.

Optionally, a dispersant is also present to improve flowability and assist the water in wetting the cement particles. By "dispersant" we mean to include any anionic surfactant, that is, any compound which contains a hydrophobic (for example, any hydrocarbon substituent, such as alkyl, aryl or alkaryl group) portion and a hydrophilic (for example, any negatively charged moiety, such as $O^-$, $CO_2^-$ or $SO_3^-$) portion. We prefer to use sulfonic acid derivatives of aromatic or aliphatic hydrocarbons, such as naphthalene sulfonic acid formaldehyde condensation product derivatives, particulary their sodium or potassium salts. Examples of dispersants that can be used include lignosulfonates; CFR-2, a sulfonate dispersant sold by the Haliburton Company; sodium naphthalene sulfonate formaldehyde condensation products, such as DAXAD-19 of W. R. Grace Company, Lomar D. of Diamond Shamrock Company, D 31 of B. J. Hughes Company, and D 65 of Dowell Company; and potassium naphthalene sulfonate formaldehyde condensation products, such as DAXAD 11 KLS of W. R. Grace Company.

Other additives conventionally added to cement compositions useful in cementing casings in the borehole of a well can also be added to the novel cement composition herein. These additives can include, for example, (1) heavy-weight additives, such as hematite, ilmenite, silica flour and sand; (2) cement retarders, such as lignins and lignosulfonates; and (3) additives for controlling lost circulations, such as walnut hulls and cellophane flakes.

The novel aqueous cement slurry can be prepared in any suitable or conventional manner, for example, by mixing the dry ingredients before addition to the aqueous solution or by adding the individual components to an aqueous slurry of cement.

Table I below defines the amounts of each of the components that can be used to prepare the novel aqueous cement slurry claimed herein, based on the weight of the dry cement.

TABLE I

| | Weight Percent | |
|---|---|---|
| | Broad Range | Preferred Range |
| Polysaccharide | 0.001–3.0 | 0.01–2.0 |
| Salts* | 0.1–7 | 0.5–5 |
| Water | 30–65 | 33–60 |
| Dispersant | 0–3.0 | 0.1–2.0 |

*Based on the weight of water

A method of cementing casing in the borehole of a well herein can comprise suspending the casing in the borehole of a well, whether vertical or slanted, pumping into the well the novel aqueous cement slurry herein until said slurry fills that portion of the space desired to be sealed and then maintaining said slurry in place until the cement sets. In a preferred embodiment the novel cement slurry herein can be pumped downwardly into the casing that has been suspended in the borehole of a well, and then circulated upwardly into the annulus surrounding the casing. Circulation can continue until the slurry fills that portion of the annular space desired to be sealed and can continue until the cement slurry returns to the surface. The cement slurry is then maintained in place until the cement sets. The cement so produced will result in a strong, continuous, unbroken bond with the outside surface of the casing and with the wall of the formation.

DESCRIPTION OF PREFERRED EMBODIMENTS

A number of cement slurries were prepared and tested using Class H cement. In all runs, the purpose was to prepare a cement slurry containing varying amounts of a polysaccharide(s) plus other additives and thus determine the rheological properties of the slurry at 300 R. The cement slurries were prepared in accordance with API Spec 10, page 16, First Edition, January 1982. The runs are summarized in Table II below. In each of Runs Nos. 1, and 3 through 12, in Table II below, the amount of cement used in preparing the slurries was 800 grams. The viscosity of each slurry in the above runs at ambient and elevated temperatures were determined in accordance with API Spec. 10, First Edition, January 1982, Appendix H, page 77, except that the slurry was transferred to the sample cup for ambient temperature readings immediately after mixing. The high pressure consistometer was used for the downhole readings at 140° F. In all of the remaining Runs in Table II below, 500 grams of Class H cement were used except Example 35, where no cement was employed. In all of these remaining Runs, the API viscosity was determined using the atmospheric pressure method described in Appendix H (page 77) to API Spec. 10, First Edition, January 1982, except that the slurry was transferred to the sample cup for ambient temperature (70° F.) readings immediately after mixing. In addition, downhole readings were obtained after heating the sample with stirring on a water bath at atmospheric pressure to 140° F. (usually 8 to 10 minutes required). In Runs Nos. 7 through 32 and 34 and 35, the carboxymethylhydroxyethylcellulose ether (CMHEC)

was sold by Hercules Co. as CMHEC 37L. In Runs Nos. 1 and 3 through 32 and 35, the hydroxyethylcellulose ether (HEC) was sold by Hercules as Natrosol 250 MBR. In Runs No. 2 through 32 and 34 and 35, the xanthan gum was sold as Kelzan XCD by Kelco Co. Run 33 used hydroxypropyl starch and Run 34 used guar gum instead of hydroxyethylcellulose.

The procedure for measuring the "Solution Time" in all runs was as follows:

To 340 ml water vigorously stirring at room temperature is added 7.00 g DAXAD-19 to form a first solution. 2.00 g of the sample to be tested are then added to the first solution in such a way that the sample is poured into the vortex of the first solution to facilitate dispersion of the sample. After about 30 seconds, the stirring is stopped and the vessel is placed on a viscosity measuring device such as a Fann VG meter or the equivalent. The viscosity is recorded as a function of time. Using the Fann VG meter, and setting the shear rate at 300 rpm, readings were taken at 1, 2, 3, 4, 5, 10, 15, 20 minutes, etc. until a constant viscosity was obtained.

It is important to control the pH and the temperature during this determination. The pH obtained by dissolving 7.00 g DAXAD-19 in 340 ml water is $9.4 \pm 0.2$. A valid test is obtained only if the pH remains at $9.4 \pm 0.2$ after the sample to be tested is added. This essentially means that the sample to be tested must be per se near neutral pH.

The temperature must also be held constant during the test. A valid test is obtained if the temperature is maintained at $23 \pm 2°$ during the test.

The value of the solution time is obtained by determining the time necessary to reach 90 percent of the final viscosity value.

TABLE II

| Example Number[1] | HEC WT. % BWOC | Lot[2] Designation for HEC | Solution Time of HEC in Minutes | Xanthan Gum WT. % BWOC | CMHEC WT. % BWOC | Dispersant BWOC WT. % DAXAD-19 | KCl WT. % BWOW | Temp. °F. (°C.) | API Viscosity Cp at 300 R |
|---|---|---|---|---|---|---|---|---|---|
| 1 | 0.208[3] | A | 25 | 0 | 0 | 0 | 3 | 72 (22.2) | 168 |
|   |   |   |   |   |   |   |   | 140 (60) | 184 |
| 2 | 0 | — | — | 0.208[4] | 0 | 0 | 3 | 72 (22.2) | 127 |
|   |   |   |   |   |   |   |   | 152 (67) | 93 |
| 3 | 0.208 | A | 25 | 0.0113 | 0 | 0.729 | 3 | 72 (22.2) | 105 |
|   |   |   |   |   |   |   |   | 140 (60) | 135 |
| 4 | 0.208 | A | 25 | 0.0113 | 0 | 0.729 | 0 | 72 (22.2) | 131 |
|   |   |   |   |   |   |   |   | 140 (60) | 113 |
| 5 | 0.208 | A | 25 | 0.0113 | 0 | 0.729 | 1 | 72 (22.2) | 113 |
|   |   |   |   |   |   |   |   | 140 (60) | 129 |
| 6 | 0.208 | A | 25 | 0.0113 | 0 | 0.729 | 5 | 72 (22.2) | 70 |
|   |   |   |   |   |   |   |   | 140 (60) | 121 |
| 7 | 0.208 | A | 25 | 0.0113 | 0.05 | 0.729 | 3% $MgCl_2$ | 72 (22.2) | 114 |
|   |   |   |   |   |   |   |   | 140 (60) | 180 |
| 8 | 0.208 | A | 25 | 0.0113 | 0.05 | 0.729 | 3% $NH_4Cl$ | 72 (22.2) | 105 |
|   |   |   |   |   |   |   |   | 140 (60) | 147 |
| 9 | 0.208 | A | 25 | 0.0113 | 0.05 | 0.729 | 3% NaCl | 72 (22.2) | 80 |
|   |   |   |   |   |   |   |   | 140 (60) | 170 |
| 10 | 0.208 | A | 25 | 0.0113 | 0.05 | 0.729 | 3% $CaCl_2$ | 72 (22.2) | 87 |
|   |   |   |   |   |   |   |   | 140 (60) | 190 |
| 11 | 0.26 | D | 9 | 0.0163 | 0.0638 | .911 | 3 | 70 (22.1) | 163 |
|   |   |   |   |   |   |   |   | 140 (60) | 152 |
| 12 | 0.26 | E | 7 | 0.0163 | 0.0638 | .911 | 3 | 70 (22.1) | 136 |
|   |   |   |   |   |   |   |   | 140 (60) | 134 |
| 13 | 0.26 | F | 18 | 0.0163 | 0.0638 | .911 | 3 | 70 (22.1) | 140 |
|   |   |   |   |   |   |   |   | 140 (60) | 166 |
| 14 | 0.26 | G | 25 | 0.0163 | 0.0638 | .911 | 3 | 70 (22.1) | 124 |
|   |   |   |   |   |   |   |   | 140 (60) | 205 |
| 15 | 0.26 | H | 20 | 0.0163 | 0.0638 | .911 | 3 | 70 (22.1) | 146 |
|   |   |   |   |   |   |   |   | 140 (60) | 182 |
| 16 | 0.26 | I | 19 | 0.0163 | 0.0638 | .911 | 3 | 70 (22.1) | 176 |
|   |   |   |   |   |   |   |   | 140 (60) | 198 |
| 17 | 0.26 | J | 20 | 0.0163 | 0.0638 | .911 | 3 | 70 (22.1) | 143 |
|   |   |   |   |   |   |   |   | 140 (60) | 194 |
| 18 | 0.26 | K | 21 | 0.0163 | 0.0638 | .911 | 3 | 70 (22.1) | 154 |
|   |   |   |   |   |   |   |   | 140 (60) | 203 |
| 19 | 0.26 | L | 22 | 0.0163 | 0.0638 | .911 | 3 | 70 (22.1) | 142 |
|   |   |   |   |   |   |   |   | 140 (60) | 196 |
| 20 | 0.26 | M | 24 | 0.0163 | 0.0638 | .911 | 3 | 70 (22.1) | 153 |
|   |   |   |   |   |   |   |   | 140 (60) | 187 |
| 21 | 0.26 | N | 25 | 0.0163 | 0.0638 | .911 | 3 | 70 (22.1) | 70 |
|   |   |   |   |   |   |   |   | 140 (60) | 123 |
| 22 | 0.208 | P | 14 | 0.0113 | .05 | .729 | 3 | 70 (22.1) | 31 |
|   |   |   |   |   |   |   |   | 152 (67) | 208 |
| 23 | 0.26 HPS[5] | — | — | 0 | 0 | 0 | 3 | 70 (22.1) | 65 |
|   |   |   |   |   |   |   |   | 140 (60) | 111 |
| 24 | 0.26 Guar Gum[6] | — | — | 0.0113 | .05 | .729 | 3 | 70 (22.1) | 33 |
|   |   |   |   |   |   |   |   | 140 (60) | 19 |
| 25[7] | 0.59 | A | 25 | 0.0125 | 0.142 | 2.08 | 2.85 | 72 (22.2) | 45 |

TABLE II-continued

| Example Number[1] | HEC WT. % BWOC | Lot[2] Designation for HEC | Solution Time of HEC in Minutes | Xanthan Gum WT. % BWOC | CMHEC WT. % BWOC | Dispersant BWOC WT. % DAXAD-19 | KCl WT. % BWOW | Temp. °F. (°C.) | API Viscosity Cp at 300 R |
|---|---|---|---|---|---|---|---|---|---|
| | | | | | | | | 150 (65.5) | 15 |

[1] All slurries had 46% water BWOC (Based on the weight of cement).
[2] Lot Designation indicates a different Lot or batch of hydroxyethylcellulose made by Hercules, Inc. All Lots bore the designation Natrosol 250 MBR.
[3] Glyoxal present as a coating on the polysaccharide (from about 0.25 to about 2.0 weight percent of polysaccharide).
[4] Solution Time for Xanthan Gum was 5 minutes.
[5] Solution Time for HPS (hydroxypropylstarch) was 25 minutes. No HEC was used in Example 23.
[6] Solution Time for Guar Gum was 6 minutes. No HEC was used in Example 24.
[7] No cement present; other components based on weight of water which was 350 cc.

Referring to Table II above, Example 1 shows that the use of an HEC having a solution time of 25 minutes results in a cement slurry exhibiting inverse rheology. By inverse rheology is meant that the slurry has an API viscosity at 140° F. which is greater than the viscosity of the same slurry at 70° F. Preferably the viscosity increases at least ten percent and the viscosity increase can be significantly greater such as increases of 50 to 200 percent or 50 to 500 percent or more. Example 2 shows that the use of a polysaccharide (xanthan gum) having a solution time of 5 minutes results in a cement slurry which does not exhibit inverse rheology.

Examples 3 through 10 show the effect on inverse rheology of using varying amounts and types of a salt (e.g., KCl). When no salt is present (Example 4), inverse rheology was not observed. The remaining Examples 3 and 5 through 10 show varying amounts of KCl or other salts can be used to obtain a cement slurry having inverse rheology.

Examples 11 through 24 illustrate the preparation of cement slurries using various Lots of HEC and other polysaccharides. These Examples further illustrate that polysaccharides having the defined solution times in accordance with this invention are required in order to prepare cement slurries having the desired inverse rheology.

Example 25 shows that a cement is required to obtain inverse rheology.

EXAMPLE 26

In the Run for this Example, a cement slurry having the same composition as Example 7 above (except KCl was used in place of MgCl₂) was prepared as described above for Example 7 and the rheology at 70° F. and 152° F. was determined. The results were as follows: Viscosity at 300 R and 70° F. was 169 and the viscosity at 300 R and 152° F. was 118, showing no inverse rheology. The HEC used for this Example 26 was a Natrosol 250 MBR Lot C and had a solution time of 6 minutes.

EXAMPLE 27

26.8 grams of a mixture of polysaccharides, i.e., 20.8 grams of a Natrosol 250 MBR Lot C hydroxyethylcellulose; 5 grams of CMHEC and 1 gram of xanthan gum was first added to a solution of 8 grams of glyoxal (40 percent aqueous solution) in 80 ml of isopropyl-alcohol. After stirring for 10 minutes, the solvent was removed in vacuo at 50° C. for 80 minutes. The sample was then dried at 82° C. for 16 hours. This mixture of polysaccharides was found to have a solution time of 50 minutes.

Example 26 was repeated using the above treated mixture of polysaccharides to prepare the cement slurry. The cement slurry was found to exhibit inverse rheology (i.e., 300 R readings of 105 and 206 cp. at 70° F. and 140° F., respectively).

A number of additional runs were made to illustrate the effect of heating on the solution times and rheological properties of certain hydroxyethylcellulose materials used in preparing the cement compositions of this invention. In Tables III and IV below, the HEC (Natrosol 250 MBR Lot B) either as received (Example 28) or after heat treatment (Examples 29–41) was used to formulate a cement slurry wherein the amount of cement was 500 g, the weight percent water based on the weight of cement was 46; the amount of KCl was 3 percent based on the weight of water; the amount of HEC was 0.26 percent based on the weight of cement; and the amount of xanthan gum was 0.0163 percent based on the weight of cement; and the amount of CMHEC was 0.0638 percent based on the weight of cement; and the amount of dispersant (DAXAD-19) was 0.911 percent based on the weight of cement. Such slurries were then tested for their API viscosities at 300 R and temperature of 70° F. and 140° F., respectively, and the results are set forth in Tables III and IV below.

TABLE III

TEMPERATURE EFFECT OF HEC HEATED 1.5 HOURS

| Example No. | Time/Temperature | Rheology Temp. | 300 R | Solution Time |
|---|---|---|---|---|
| 28 | As Received | 70° F. | 143 | 5 minutes |
| | | 140° F. | 139 | |
| 29 | 1.5 h/90° C. | 70° F. | 175 | 6 minutes |
| | | 140° F. | 152 | |
| 30 | 1.5 h/100° C. | 70° F. | 184 | 6 minutes |
| | | 140° F. | 161 | |
| 31 | 1.5 h/110° C. | 70° F. | 184 | 6 minutes |
| | | 140° F. | 159 | |
| 32 | 1.5 h/120° C. | 70° F. | 159 | 8 minutes |
| | | 140° F. | 153 | |
| 33 | 1.5 h/130° C. | 70° F. | 87 | 25 minutes |
| | | 140° F. | 154 | |
| 34 | 1.5 h/140° C. | 70° F. | 102 | — |
| | | 140° F. | 151 | |
| 35 | 1.5 h/150° C. | 70° F. | 61 | — |
| | | 140° F. | 83 | |

Referring to Table III, heating the HEC at a temperature from 90° C. to 110° C. for 1.5 hours still results in solution times for the HEC of only 6 minutes and the resulting slurries exhibited normal rheology, i.e., the viscosity decreased as the temperature increased (Examples 29–31). Example 32 shows that at a temperature of about 120° C. inverse rheology is almost achieved. It is to be noted that the solution time for the HEC from Example 32 was 8 minutes.

Example 33 illustrates that inverse rheology is achieved by heating to a temperature of 130° C. and the solution time of the HEC was 25 minutes.

In Examples 34 and 35, the solution times of the heated HEC's were not taken, but the rheological properties of the cement slurries indicate that heating to 140° and 150° C. results in inverse rheology.

The procedure used for the heat treatment of the samples of HEC used in the runs for the examples in Table III above and Table IV below was as follows:

The sample to be treated (50 g) was placed on a watch glass or in a flat pan and spread out so that a large surface area was exposed. Typically, the sample was less than one-half inch thick. The sample was then placed in an oven at the desired temperature in air or under an atmosphere of nitrogen. After heating for the desired time, the sample was cooled in air and then broken up with a spatula and passed through a 20-mesh screen.

In yet another series of runs, an HEC (Natrosol 250 MBR-Lot C) was heated at a constant temperature of 130° C. for varying times. These runs are summarized in Table IV below. It should be noted that the use of the designation of various Lot numbers of HEC, i.e., Lot B, Lot C, indicate that separately prepared batches of HEC were obtained from Hercules.

TABLE IV

TIME STUDY OF HEC RHEOLOGY EFFECT

| Example No. | Time/Temperature | Rheology Temp. | Rheology 300 R | Solution Time |
|---|---|---|---|---|
| 36 | 0.5 h/130° C. | 70° F. | 266 | — |
|  |  | 140° F. | 222 |  |
| 37 | 1.0 h/130° C. | 70° F. | 228 | — |
|  |  | 140° F. | 242 |  |
| 38 | 1.5 h/130° C. | 70° F. | 207 | — |
|  |  | 140° F. | 238 |  |
| 39 | 2.0 h/130° C. | 70° F. | 154 | — |
|  |  | 140° F. | 239 |  |
| 40 | 2.5 h/130° C. | 70° F. | 136 | — |
|  |  | 140° F. | 218 |  |
| 41 | As Received | 70° F. | 168 | 6 minutes |
|  |  | 140° F. | 153 |  |

Referring to Table IV above, it can be seen that heating an HEC for 0.5 hours (Example 36) at 130° C. was insufficient to result in the production of a cement slurry where the viscosity increases with temperature. The composition of the cement slurries used for all of the Examples in Table IV was the same as the composition of the cement slurries used for the Examples in Table III above. Heating the HEC at 130° C. for a time of about 1.5 hours appears to be desirable to result in a cement slurry which increases in viscosity with increasing temperature (Example 38). The HEC used in all of the runs in Table IV was the same HEC used in Example 17 in Table II above and had a solution time of about 6 minutes. Referring to Example 17 in Table II, the cement slurry had normal rheological properties. Although the solution times for the heat-treated HEC materials for Examples 36–41 of Table IV were not obtained, it is concluded from the rheological properties of the cement slurries made using the heat-treated materials that a treating time of at least about 1 hour at 130° C. is necessary to ensure that an HEC having an appropriate solution time is obtained.

EXAMPLE 42

The aqueous cement slurry having the composition of Example 3 in Table II above, was pumped at a rate of 420 gallons per minute (1.587 m$^3$/minute) through an annular space simulating a seven-inch (17.78 cm) OD well casing inside a 9.875-inch (25.08 cm) well bore. As noted in Table II above, the HEC had a solution time of 25 minutes. The following table sets forth Reynolds Numbers for certain of these displacement rates. These were determined in accordance with API Bulletin 13 D, First Edition, August 1980, page 6.

| Displacement Rates, Gallons Per Minute | Reynolds No. |
|---|---|
| 100 | 161 |
| 420 | 896 |
| 840 | 2048 |
| 1260 | 3322 |

The above table shows that at a nominal displacement rate of 100 gallons per minute (0.378 m$^3$/minute) or 420 gallons per minute (1.587 m$^3$/minute), the Reynolds Number is less than the threshold of 3000 for turbulent flow. Since normal displacement rates in cementing operations are in the range of about 84 gallons per minute (0.317 m$^3$/minute) to about 500 gallons per minute (1.89 m$^3$/minute), pumping of the novel aqueous cement slurry herein under such normal displacement operations will not cause the aqueous cement slurry to enter the turbulent region.

EXAMPLE 43

A blend was prepared containing 800 g of Class H cement and, based on the weight of the dry cement, 0.208 weight percent of hydroxyethylcellulose ether (Natrosol 250 MBR) having a solution time of 25 minutes (Lot A), 0.0113 weight percent of xanthan gum (Kelzan XCD), 0.729 weight percent of DAXAD-19 and 1.38 weight percent of potassium chloride. This dry blend was then sealed in a jar and placed in a freezer for 24 hours at 15° F. (−9.4° C.). The blend was then removed from the jar and 368 cc of tap water cooled to 46° F. (7.7° C.) was added thereto and mixed in a commercial blender for 35 seconds. The resultant slurry temperature was 38° F. (3.3° C.). The API 300 R viscosity was 71 cp. An identical composition at 72° C. (22.2° C.) had an API viscosity of 98 cp. This unusual property, therefore, enables one to prepare the cement slurry at very low temperatures with great ease. This is most unusual, for conventional aqueous cement slurries containing polysaccharides alone or with dispersants are extremely difficult to mix at low temperatures, as a result of which, slurry densities may be low, the cements may have lower compressive strengths, and may result in hydrostatic pressures insufficient to contain formation pressures.

While the novel aqueous cement slurries described and claimed herein can be used in cementing wells, it is understood that they can also be used in other situations wherein cement work is desired, for example, construction cements, grouts, mortars, plasters, patching cements, etc.

Obviously, many modifications and variations of the invention, as hereinabove set forth, can be made without departing from the spirit and scope thereof, and therefore only such limitations should be imposed as are indicated in the appended claims.

We claim:

1. A cement composition for the preparation of an aqueous cement slurry useful in cementing casing in the borehole of a well comprising (1) a cement selected from Class A through Class H; (2) at least one polysaccharide or mixture of polysaccharides having a solution time greater than about 10 minutes; and (3) at least one salt and wherein the amount of said polysaccharide or mixture of polysaccharides is sufficient so that the viscosity of said aqueous slurry increases with an increase in temperature.

2. The cement composition of claim 1 wherein the cement is a Class H cement.

3. The cement composition of claim 1 wherein the polysaccharide is defined by the formula $C_nH_{2n}O_n$, wherein n is equal to or greater than 4.

4. The cement composition of claim 3 wherein n is below 10.

5. The cement composition of claim 1 wherein the polysaccharide has a molecular weight in the range of about 10,000 to about 10,000,000.

6. The cement composition of claim 1 wherein the polysaccharide has a molecular weight in the range of about 100,000 to about 3,000,000.

7. The cement composition of claim 1 wherein the polysaccharide component includes hydroxyethylcellulose ether.

8. The cement composition of claim 1 wherein the polysaccharide component includes hydroxypropylcellulose ether.

9. The cement composition of claim 1 wherein the polysaccharide component includes xanthan gum.

10. The cement composition of claim 1 wherein the polysaccharide component includes carboxymethylhydroxyethylcellulose ether.

11. The cement composition of claim 1 wherein the polysaccharide component includes hydroxyethylcellulose ether and xanthan gum.

12. The cement composition of claim 1 wherein the polysaccharide component includes hydroxyethylcellulose ether, xanthan gum and carboxymethylhydroxyethylcellulose ether.

13. The cement composition of claim 1 wherein the salt component includes potassium chloride.

14. The cement composition of claim 1 wherein the salt component includes magnesium chloride.

15. The cement composition of claim 1 wherein the salt component includes ammonium chloride.

16. The cement composition of claim 1 wherein the salt component includes sodium chloride.

17. The cement composition of claim 1 wherein the salt component includes calcium chloride.

18. The cement composition of claim 1 wherein a dispersant is also present.

19. The cement composition of claim 18 wherein said dispersant is an anionic dispersant.

20. The cement composition of claim 18 wherein said dispersant is a sulfonic acid derivative of an aromatic or aliphatic hydrocarbon.

21. The cement composition of claim 18 wherein said dispersant is a polynaphthalene sulfonate.

22. The cement composition of claim 18 wherein said dispersant is a sodium naphthalene sulfonate formaldehyde condensation product.

23. The cement composition of claim 18 wherein said dispersant is a potassium naphthalene sulfonate formaldehyde condensation product.

24. The cement composition of claim 1 wherein said components are present in the following weight percent based on the weight of the cement:

|  | Weight Percent |
| --- | --- |
| Polysaccharide | 0.001–3.0 |
| Salt(s) | 0.001–4.5 |

25. The cement composition of claim 1 wherein said components are present in the following weight percent, based on the weight of the cement:

|  | Weight Percent |
| --- | --- |
| Polysaccharide | 0.01–2.0 |
| Salt(s) | 0.1–3.0 |

26. A aqueous cement slurry comprising any of the compositions of claims 1 through 25, inclusive, plus water.

27. A method of cementing casing in the borehole of a well comprising suspending the casing in the borehole of a well, whether vertical or slanted, pumping an aqueous cement slurry into the well until said slurry fills that portion of the space desired to be sealed, said aqueous cement slurry comprising (1) a cement selected from Class A through Class H, (2) at least one polysaccharide or mixture of polysaccharides having a solution time of greater than about 10 minutes, (3) water, and (4) at least one salt and wherein the amount of said polysaccharide or mixtures of polysaccharides is sufficient so that said aqueous slurry increases in viscosity as temperature increases and then maintaining said slurry in place until the cement sets.

28. The method of claim 27 but wherein the cement in the aqueous cement slurry is a Class H cement.

29. The method of claim 27 but wherein the polysaccharide in the aqueous cement slurry is defined by the formula $C_nH_{2n}O_n$, wherein n is equal to or greater than 4.

30. The method of claim 27 but wherein said polysaccharide n is below 10.

31. The method of claim 27 but wherein said polysaccharide has a molecular weight in the range of about 10,000 to about 10,000,000.

32. The method of claim 27 but wherein the polysaccharide has a molecular weight in the range of about 100,000 to about 3,000,000.

33. The method of claim 27 but wherein the polysaccharide component includes hydroxyethylcellulose ether.

34. The method of claim 27 but wherein the polysaccharide component includes xanthan gum.

35. The method of claim 27 but wherein the polysaccharide component includes carboxymethylhydroxyethylcellulose ether.

36. The method of claim 27 but wherein the polysaccharide component includes hydroxyethylcellulose ether and xanthan gum.

37. The method of claim 27 but wherein the polysaccharide component includes hydroxyethylcellulose ether, xanthan gum and carboxymethylhydroxyethylcellulose ether.

38. The method of claim 27 but wherein the salt component includes potassium chloride.

39. The method of claim 27 but wherein the salt component includes magnesium chloride.

40. The method of claim 27 but wherein the salt component includes ammonium chloride.

41. The method of claim 27 but wherein the salt component includes sodium chloride.

42. The method of claim 27 but wherein the salt component includes calcium chloride.

43. The method of claim 27 but wherein said aqueous cement slurry contains, in addition, a dispersant.

44. The method of claim 43 but wherein the dispersant is an anionic dispersant.

45. The method of claim 43 but wherein the dispersant is a sulfonic acid derivative of an aromatic or aliphatic hydrocarbon.

46. The method of claim 43 but wherein the dispersant is a polynaphthalene sulfonate.

47. The method of claim 43 but wherein the dispersant is a sodium naphthalene sulfonate formaldehyde condensation product.

48. The method of claim 43 but wherein the dispersant is a potassium naphthalene sulfonate formaldehyde condensation product.

49. The method of claim 27 but wherein said components are present in the following weight percent based on the weight of the cement:

|  | Weight Percent |
|---|---|
| Polysaccharide | 0.001–3.0 |
| Water | 30–65 |
| Salt(s) | 0.001–5.0 |

50. The method of claim 27 but wherein said components are present in the following weight percent, based on the weight of the cement:

|  | Weight Percent |
|---|---|
| Polysaccharide | 0.01–2.0 |
| Water | 35–60 |
| Salt(s) | 0.1–3.0 |

51. The method of claim 50 but wherein the aqueous cement slurry contains, in addition, from 0.1 to 2 weight percent of a dispersant based on the weight of cement.

52. The cement composition of claim 1 wherein the polysaccharide or mixture of polysaccharides has a solution time from 12 to about 120 minutes.

53. The cement composition of claim 52 wherein the solution time of the polysaccharide or mixture of polysaccharides is from about 14 to about 40 minutes.

54. The method of claim 27 wherein the polysaccharide or mixture of polysaccharides has a solution time from 12 to about 120 minutes.

55. The method of claim 54 wherein the solution of the polysaccharide or mixture of polysaccharides is from 14 to about 40 minutes.

* * * * *